United States Patent
Staser

(10) Patent No.: US 6,189,267 B1
(45) Date of Patent: *Feb. 20, 2001

(54) DOOR MODULE WITH OUTSIDE DOOR HANDLE

(75) Inventor: Brian Hale Staser, Troy, MI (US)

(73) Assignee: General Motors Corporation, Detroit, MI (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/033,050

(22) Filed: Mar. 2, 1998

(51) Int. Cl.[7] .................................................. E06B 3/00
(52) U.S. Cl. ............................................................. 49/503
(58) Field of Search ..................... 49/502, 503; 292/336, 292/3, 348, 350, DIG. 53, DIG. 67; 296/146.5

(56) References Cited

U.S. PATENT DOCUMENTS

| | | | |
|---|---|---|---|
| 4,653,143 | * 3/1987 | Ketelhut et al. | 292/336.3 X |
| 5,251,403 | 10/1993 | Compeau et al. | 49/502 |
| 5,263,750 | * 11/1993 | Smith et al. | 292/336.3 |
| 5,340,174 | * 8/1994 | Bender et al. | 292/336.3 |
| 5,377,450 | * 1/1995 | Varajon | 49/503 X |
| 5,535,553 | 7/1996 | Staser et al. | 49/502 |
| 5,904,002 | * 5/1999 | Emerling et al. | 49/503 X |

* cited by examiner

Primary Examiner—Jerry Redman
(74) Attorney, Agent, or Firm—Patrick M. Griffin

(57) ABSTRACT

A vehicle door includes inner and outer panels defining a cavity therebetween. The outer panel has an opening therein for receiving a door latch operating handle. An outside door handle assembly includes a housing and an operating handle movably mounted on the housing. A door module frame for mounting within the door cavity has a door handle support arm extending into proximity with the opening of the door outer panel. A snap retainer is provided acting between the housing of the outside handle assembly and the support arm of the module frame to loosely mount the handle assembly on the module frame so that mounting of the module frame within the door cavity carries the operating handle of the door handle assembly into general alignment with the opening of the door outer panel. An escutcheon is provided for installation onto the outside of the outer panel to surround the opening in the outer panel. A plurality of fasteners are installed through the door handle housing, through apertures provided in the outer panel, and into the escutcheon so that the escutcheon and door handle assembly are attached together with the door outer panel captured therebetween.

5 Claims, 2 Drawing Sheets

DOOR MODULE WITH OUTSIDE DOOR HANDLE

TECHNICAL FIELD

This invention relates to a door module for installation into a vehicle door and more particularly provides a door module which carries the outside door handle for installation onto the outer panel of the vehicle door.

BACKGROUND OF THE INVENTION

It is well known that a conventional motor vehicle door is comprised of an inner panel and an outer panel defining a cavity therebetween.

It is also well known to construct a door hardware module comprised of a plastic or metal frame upon which various subassemblies such as the window regulator, door latch, inside door handle and radio speaker are preconnected and tested so that they are carried to the vehicle as an already assembled unit for installation into the vehicle door.

The present invention provides a vehicle door construction in which the door hardware module also includes the outside door handle so that the outside door handle may be preconnected to the door latch via connecting rods so that the outside door handle assembly can be tested before installation into the vehicle door. Furthermore, upon installation of the module in the door, the handle is presented for attachment to the door outer panel.

SUMMARY OF THE INVENTION

According to the invention, a vehicle door includes inner and outer panels defining a cavity therebetween. The outer panel has an opening therein for receiving a door latch operating handle. An outside door handle assembly includes a housing and an operating handle movably mounted on the housing. A door module frame for mounting within the door cavity has a door handle support arm extending into proximity with the opening of the door outer panel. A snap retainer is provided acting between the housing of the outside handle assembly and the support arm of the module frame to loosely mount the outside handle assembly on the module frame so that mounting of the module frame within the door cavity carries the operating handle of the door handle assembly into general alignment with the opening of the door outer panel. An escutcheon is provided for installation onto the outside of the outer panel to surround the opening in the outer panel. A plurality of fasteners are installed through the door handle housing, through apertures provided in the outer panel, and into the escutcheon so that the escutcheon and door handle assembly are attached together with the door outer panel captured therebetween.

BRIEF DESCRIPTION OF THE DRAWINGS

These and other objects, features and advantages of the invention will become apparent upon consideration of the Description of the Preferred Embodiment and appended drawings in which.

DESCRIPTION OF THE PREFERRED EMBODIMENT

Figure 1:
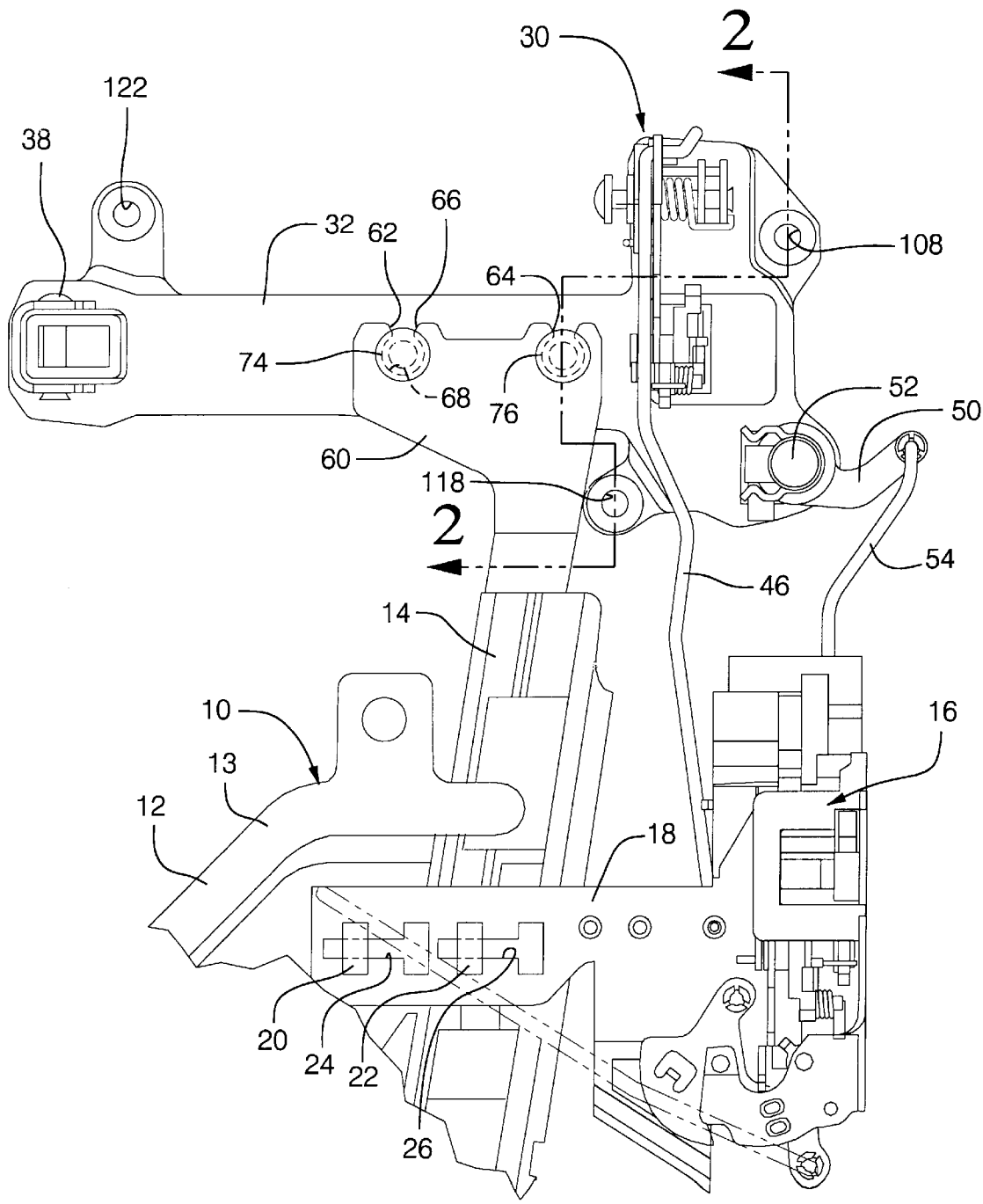
FIG. 1 is a side elevation view showing a portion of the door module frame with the outside door handle assembly loosely mounted thereon by snap retainers.
Figure 2:
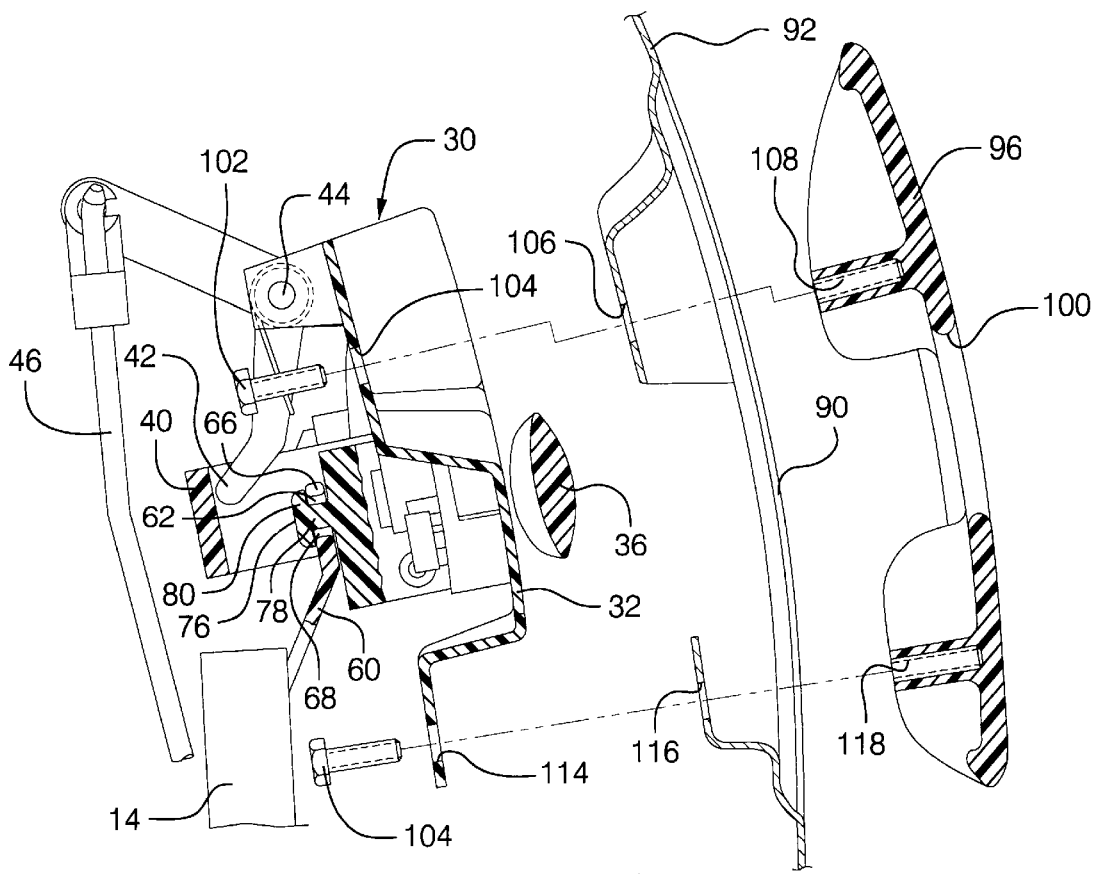
FIG. 2 is an exploded view showing the door module being installed into the door and an escutcheon for installation onto the outside of the outer panel.
Figure 3:
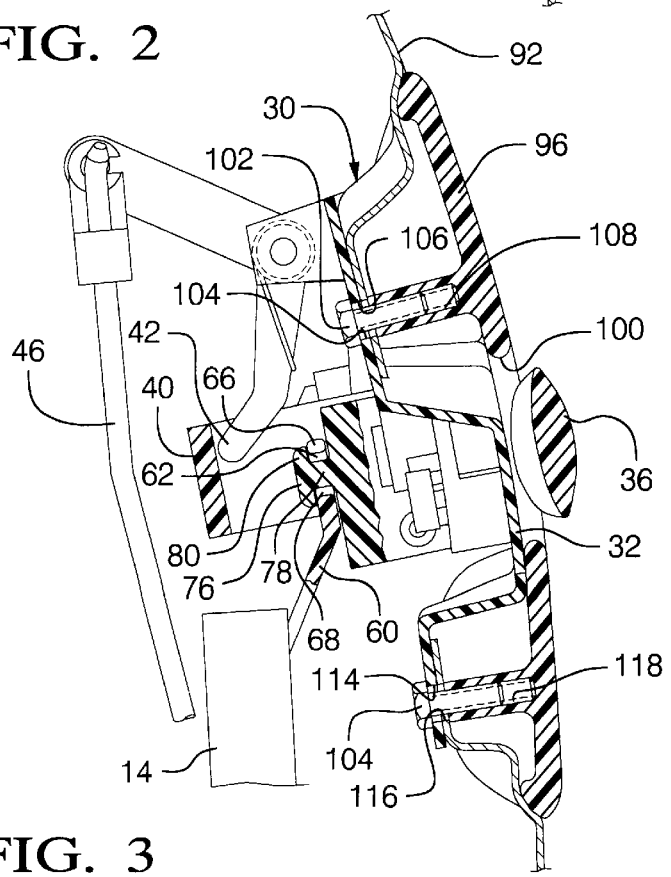
FIG. 3 is a section view corresponding to FIG. 2 but showing fasteners installed to complete attachment to the outside door handle assembly and escutcheon onto the door.

Referring to FIGS. 1 and 2, it is seen that a vehicle door hardware module generally indicated at 10 includes a molded plastic module frame 12 including a horizontal runner 13 and a vertical rail 14. FIG. 1 shows only the upper corner of such a door module, it being understood that reference may be had to U.S. Pat. No. 5,535,553 for a more detailed description of a prior art door module.

As seen in FIG. 1, a door latch assembly generally indicated at 16 is loosely attached to the module 10 by headed studs 20 and of the module frame 22 which fit into over-sized key hole slots 24 and 26 provided respectively in a mounting bracket 18 attached to the door latch 16.

As seen in FIGS. 1 and 2, a door handle assembly generally indicated at 30 is also mounted on the door module frame 12. The door outside handle assembly 30 includes a housing 32. A pull handle 36 has one end mounted on housing 32 by a pivot shaft 38. The other end of the pull handle 36 carries an operating abutment 40. When the pull handle 36 is pulled, the abutment 40 is carried into engagement with a lever 42. The lever 42 is pivotally mounted to the housing 32 at a pivot 44 and has a latch operating rod 46 which is connected with the door latch 16 to unlatch the door latch. The door handle assembly 30 also has a key cylinder 52 which operates a lock lever 50 and lock rod 54 so that operation of the key cylinder 52 will lock and unlock the door latch 16.

As best seen in FIGS. 1 and 2, the door handle housing 32 is connected to the module 10. In particular, the module frame 12 includes a support arm portion 60 which extends upwardly from the vertical rail 14 of module frame 12 and has a pair of keyhole shaped slots 62 and 64 therein. Each of the keyhole slots includes an open entry mouth 66 and a larger aperture portion 68. The door handle frame 32 carries a pair of headed studs 74 and 76. As best seen in FIG. 2, the headed stud 76 includes a shank 78 and a head 80. The door handle assembly 30 is snap attached to the support arm portion 60 of the module frame 12 by aligning the headed studs 74 and 76 with the respective keyhole slots 62 and 64 and then pressing the door handle assembly 30 downwardly to snap the shank 78 of the headed studs through the narrow opening 66. The diameter of the shank 78 is less than the diameter of the aperture portion 68 of the keyhole slots and the length of the shank 78 is greater than the thickness of the support arm 60 of the module frame 14 so that the door handle assembly 30 is loosely attached to the module frame 12 and can float somewhat in relation to the module frame 12.

As seen in FIG. 2, the door module frame 12 including the door handle assembly 30 carried thereon, is installed into the vehicle door with the door handle 36 aligning with an opening 90 provided in the door outer panel 92. A molded plastic escutcheon 96 is aligned with the outside of the door and has a central opening 100 which aligns with the handle 36. As seen in FIG. 2, bolts 102 and 104 are provided to attach the handle assembly 30, door outer panel 92 and escutcheon 96. In particular, it is seen that the bolt 102 extends through a bolt hole 104 of the handle frame 32, through a bolt hole 106 of the door outer panel 90, and is threadedly received in a bore 108 of the escutcheon 96. Likewise, the bolt 104 is installed through a bolt hole 114 of door handle housing 32, bolt hole 116 of door outer panel 90, and is threaded into bore 118 of the escutcheon. Referring again to FIG. 1, it is seen that the door handle housing 32 also has an additional bolt hole 122 which will also receive a bolt and be threaded into the escutcheon 96.

It will be understood and appreciated that the loose fitting snap retention of the door handle assembly onto the module frame 12 via the snap retaining headed studs 74 and 76 will permit some movement of the door handle assembly 30 relative to the module frame 12 to permit the proper alignment of the door handle assembly 30 with the door outer panel 92. It will also be understood that the loose fit attachment provided by key hole slots 62 and 64 and headed studs 74 and 76 is just one example of a loose fit attachment and other loose fit attachments may be provided. For example, other loose fitting retainer arrangements can be obtained via slide fitting retainers, flexible retainers or other loose fitting connections known in the prior art.

Thus, it is seen that the invention provides a new and improved modular door arrangement in which an outside door handle assembly 30 may be loosely attached to the door hardware module and carried to the vehicle as part of a door hardware module and then an escutcheon applied to the outside of the door outer panel to receive bolts for attaching the door handle assembly to the vehicle door.

I claim:

1. A vehicle door assembly comprising:

a vehicle door having an inner panel and an outer panel defining a door cavity, the outer panel having a door handle opening therein;

an outside door handle assembly including a housing and an operating handle movably mounted on the housing;

the operating handle being insertable through the door handle opening from the door cavity so as to be disposed outside the outer panel, a module frame mounted within the door cavity, the module frame having an attached door latch and a door handle support portion;

a rod operatively connecting the operating handle to the door latch to unlatch the door latch, and a retainer acting between the housing of the outside door handle assembly and the support portion of the module frame to mount the handle assembly loosely on the module frame so that the module frame carries the operating handle of the door handle assembly into alignment with the door handle opening of the door outer panel in readiness for attachment of the door handle assembly to the door outer panel when the module frame is mounted within the door cavity.

2. A vehicle door assembly comprising:

a vehicle door having an inner panel and an outer panel defining a door cavity, the outer panel having a door handle opening therein;

an outside door handle assembly including a housing and an operating handle movably mounted on the housing;

the operating handle being insertable through the door handle opening from the door cavity so as to be disposed outside the outer panel, a module frame mounted within the door cavity, the module frame having an attached door latch and a door handle support portion;

an operating rod operatively connecting the operating handle to the door latch to unlatch the door latch, a retainer acting between the housing of the outside door handle assembly and the support portion of the module frame to mount the handle assembly loosely on the module frame so that the module frame carries the operating handle of the door handle assembly into alignment with the door handle opening of the door outer panel in readiness for attachment of the door handle assembly to the door outer panel when the module frame is mounted within the door cavity, an escutcheon for installation onto the outside of the outer panel to surround the opening and the door operating handle, and a plurality of fasteners between the door handle housing and the escutcheon so that the escutcheon and the door handle assembly are attached to the door outer panel with the outer panel sandwiched between the escutcheon and the housing.

3. The door assembly of claim 2 further comprising aligned apertures provided in the door handle housing, the door outer panel, and the escutcheon and the plurality of fasteners being installed through the aligned apertures so that the escutcheon and the door handle assembly are attached together with the door outer panel captured therebetween.

4. The vehicle door assembly of claim 2 wherein the outside door handle assembly includes a key lock cylinder that operates a lock lever of the door latch via a second operating rod.

5. A vehicle door assembly comprising:

a vehicle door having an inner panel and an outer panel defining a door cavity, the outer panel having a door handle opening therein;

an outside door handle assembly including a housing and an operating handle movably mounted on the housing;

the operating handle being insertable through the door handle opening from the door cavity so as to be disposed outside the outer panel, a module frame mounted within the door cavity, the module frame having an attached door latch and a door handle support portion;

a rod operatively connecting the operating handle to the door latch to unlatch the door latch, a pair of headed studs provided on one of the housing and the module frame, and a complimentary pair of keyhole shaped slots provided on the other of the housing and the module frame to provide a loose fitting snap retainer holding the housing and the module frame together so that the module frame carries the operating handle of the door handle assembly into alignment with the door handle opening of the outer panel in readiness for attachment of the door handle assembly to the outer panel when the module frame is mounted within the door cavity.

\* \* \* \* \*